Feb. 3, 1970 A. R. BERDING 3,493,788
MEMORY CELL HAVING A RESISTANCE NETWORK TO PREVENT SATURATION
Filed Jan. 16, 1967
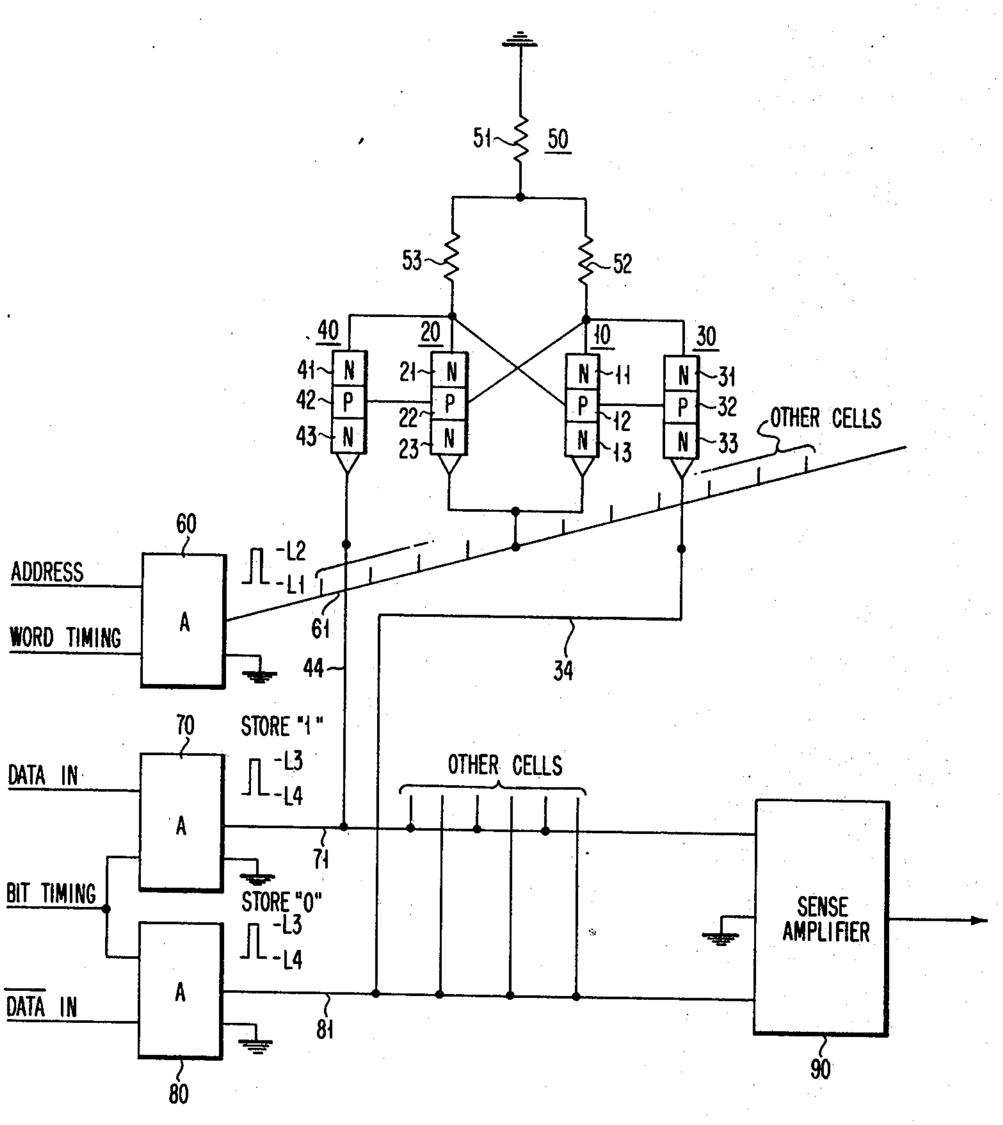
INVENTOR.
ANDREW R. BERDING
BY *Vincent W. Cleary*
ATTORNEY United States Patent Office 3,493,788

Patented Feb. 3, 1970

3,493,788
MEMORY CELL HAVING A RESISTANCE NETWORK TO PREVENT SATURATION

Andrew R. Berding, San Jose, Calif., assignor to International Business Machines Corporation, Armonk, N.Y., a corporation of New York Filed Jan. 16, 1967, Ser. No. 609,435
Int. Cl. H03k *3/26*
U.S. Cl. 307—291 5 Claims

ABSTRACT OF THE DISCLOSURE

A bistable memory cell utilizing cross-coupled transistors. The input is provided by two transistors having their bases and collectors directly connected to the base and collector of a corresponding one of the cross-coupled transistors. A resistive voltage divider is employed so as to prevent bias across the collector base junction from exceeding 350 mv. In so doing, saturation of the transistors is prevented.

CROSS-REFERENCES TO RELATED APPLICATIONS

Ser. No. 465,593, filed June 21, 1965, now Patent No. 3,423,737, entitled "Transistor Memory Cell" in the name of Leonard R. Harper.

BACKGROUND OF THE INVENTION

Field of the invention

Semiconductor bistable circuit using cross-coupled transistors.

Description of the prior art

The most pertinent known prior art is the above described patent application. The memory cell of that patent application and other memory cells utilizing two alternately conducting transistors switch one transistor into saturation in one state and the other transistor into saturation in the complementary state. Since the conducting transistor is saturated, there is a definite limitation on how fast the cell can switch due to the time required to remove the conducting transistor from saturation.

Accordingly, an object of the invention is to provide a new and improved memory cell having a relatively fast switching speed.

A further object of the invention is the provision of a memory cell whose switching time is not limited by the time required to remove the transistor from saturation.

A still further object of the invention is the provision of a memory cell that does not saturate.

SUMMARY OF THE INVENTION

The above objects of the present invention are accomplished by a memory cell having cross-coupled transistors with means operative with the voltage supply to prevent the forward voltage drop across the base collector junction of the transistors from exceeding a predetermined value. By preventing the forward voltage drop across these junctions from exceeding a given value, the transistor is thereby prevented from saturating.

The foregoing and other objects, features and advantages of the invention will be apparent from the more particular description of the preferred embodiment of the invention as illustrated in the drawing which is a preferred embodiment of the memory cell.

BRIEF DESCRIPTION OF THE DRAWING

The schematic diagram in the drawing illustrates a memory cell embodying the invention.

DESCRIPTION OF THE PREFERRED EMBODIMENT

The memory cell includes a first NPN transistor 10, a second NPN transistor 20, a third NPN transistor 30 and a fourth NPN transistor 40. The first transistor 10 has a collector 11, base 12 and emitter 13. The second transistor has a collector 21, a base 22 and emitter 23. The third transistor 30 has a collector 31, a base 32 and emitter 33. The fourth transistor 40 has a collector 41, a base 42, and emitter 43.

Similar to the above patent application, the collectors 11 and 31 are directly connected (or common) and the bases 12 and 32 are directly connected. Collectors 21 and 41 are directly connected and bases 22 and 42 are directly connected.

To provide the bistable characteristic, transistors 10 and 20 are cross-coupled by directly connecting collector 11 to base 22 and directly connecting collector 21 to base 12.

A voltage divider network 50 is provided which is effective to prevent the forward voltage drop of the base collector junction of transistors 10 and 20 from exceeding a predetermined value (normally 350 mv.). In so doing, the network 50 prevents saturation of transistors 10 and 20.

An AND gate 60 has its output connected directly to emitters 13 and 23 by an interrogate line 61. Emitters 13 and 23 are directly connected. The conductor 61 is also normally connected to other cells (not shown). AND gate 60 has two inputs, the address and the word timing.

Conductor 44 connects emitter 43 to line 71 which is connected to the output of AND gate 70 and conductor 34 connects emitter 33 to line 81 which is connected to the output of AND gate 80. Conductor 61 is effective to provide readout of the cell through conductors 34 and 44 to a sense amplifier 90.

AND gates 70 and 80 are employed to store data in the memory cell. AND gate 70 has two inputs, the bit timing pulse and data. AND gate 80 has two inputs also, the bit timing pulse and the complement of the data.

AND gate 60 has two output levels L1 (e.g. —3 volts) and L2 (e.g. 0 volt or ground). If the two inputs to gate 60 are "one," the output will be L2 otherwise the output of gate 60 will be L1.

AND gates 70 and 80 have two output levels. L3 which is the same as L2 (e.g. 0 volt) and L4 (e.g, —2 volts) which is less negative than L1. The bit timing pulses are ones. If either 70 or 80 has a coincidence of two ones on their two inputs their output will be L3. Otherwise their outputs will remain at L4.

OPERATION

The information of the cell is contained in the transistors 10 and 20. The AND gate 60 provides the voltage supply for the conducting transistor. The gate 60 has two output levels L1 (e.g. —3 volts) and L2 (e.g. 0 volt). If the output of gate 60 is L2, neither transistor 10 or 20 is conducting. If the output of gate 60 is L1, either transistor 10 or transistor 20 is conducting. If transistor 10 is conducting (in a stored or latched state), the current path includes resistors 51 and 52, transistor 10, conductor 61 and the output of gate 60 (L1, e.g. —3 volts). It can be seen that under such conditions, the direct connection between collector 11 and base 22 will prevent transistor 20 from conducting. Transistors 30 and 40 will not conduct because the output of gates 70 and 80 is L4 which is less negative than L1. It will also be noted that the forward voltage drop across the base collector junction of transistor 10 will be equal to the voltage drop across resistor 52.

If transistor 20 is conducting (in a stored state), the current path includes resistors 51 and 53, transistor 20, conductor 61 and the output of gate 60 (L1, e.g. −3 volts). It can be seen that under these conditions, the direct connection between collector 21 and base 12 will prevent transistor 10 from conducting. Transistors 30 and 40 will not be conducting because the output of gates 70 and 80 is L4 which is less negative than L1. It will also be noted that the forward voltage drop across the collector base junction of transistor 20 will be equal to the drop across resistor 53.

Interrogation of the cell is effected when the output of gate 60 goes to L2 or ground (by coincidence of address and word timing inputs). This causes transistors 10 and 20 to turn off and their currents will flow through either transistors 30 or 40, respectively, depending on the contents of the cell (e.g., if 10 was conducting, current will pass through transistor 30 and likewise if 20 was conducting, current will pass through transistor 40). If as a result of an L2 output of gate 60, current flows through transistor 30 and lead 34 to lead 81, the cell has a "one." If current flows through lead 81, the sense differential amplifier 90 senses a "one."

If as a result of an L2 output of gate 60, transistor 40 conducts and not transistor 30, the cell will have a "zero" since no current will be sensed by differential amplifier 90 on lead 81 but only on lead 71.

Storage into the cell can occur only when the output of gate 60 is L2 and the output of either gate 70 or 80 is L3 with the other gate L4. Consequently, storage occurs only on coincidence of word timing and bit timing pulses.

Upon coincidence of bit timing pulses and data, either AND gate 70 or 80 will have an L3 output depending on the polarity of the data. Gates 70 and 80 have output levels of L3 (0 volt) and L4 (−2 volts). If a "one" is to be stored, gate 70 will have an L3 output and gate 80 will remain at an L4 output. If a "zero" is to be stored, gate 70 will remain at L4 and gate 80 will have an L3 output.

When gate 70 is conditioned to store "one," transistor 40 is held off and transistor 30 will conduct (both 10 and 20 being off by an L2 output on gate 60). When gate 60 returns to L1, transistor 20 will be held off by the direct connection between collector 11 and base 22. As a result, the cell will have a "one" stored with transistor 10 conducting and transistors 20, 30 and 40 all cut off. As stated above when the output of gate 60 is L1, transistors 30 and 40 will not conduct because either output of gates 70 and 80 (L3 or L4) is less negative than L1.

When it is desired to store a "zero," gate 60 will have an L2 output cutting off transistors 10 and 20 and gate 80 will have an L3 output. This will cut off transistor 30 and transistor 40 will conduct. When gate 60 returns to an L1 output, the direct coupling between collector 21 and base 12 will prevent transistor 10 from conducting but transistor 20 will start conducting. Thus, the cell contains a "zero" with transistor 20 conducting and transistors 10, 30 and 40 not conducting.

Although as shown the sense amplifier will see a change in levels from gates 70 and 80, these changes would normally be distinguished from readout pulses by predetermined clocked or timing periods.

When one of the two transistors of a conventional memory cell is conducting designating either a "one" or a "zero," it is held in saturation. To recover from saturation to non-conducting, takes a finite period of time (e.g., several seconds). As a result, recovery time from saturation is a definite limitation on the switching time of conventional memory cells.

Thus, it is seen that when the cell is in a "one" state, transistor 10 is conducting with transistors 20, 30 and 40 being held off. As such the forward voltage drop across the base collector junction of transistor 10 is equal to the voltage drop across resistor 52 (since there is virtually no current through resistor 53). Thus, by selecting proper values for resistors 51 and 52 with respect to the voltage level L1, this forward voltage drop can be accurately regulated. If voltage drop across this junction does not exceed a certain value (normally 350 mv.), the transistor will not saturate. Thus, resistors 51 and 52 are chosen to prevent saturation of transistors 10 and 30 to thereby minimize the switching time.

If a cell is in a "zero" state, transistor 20 is conducting with transistors 10, 30 and 40 being held off. In this case, the forward voltage drop of the collector base junction of transistor 20 is equal to the voltage drop across the resistor 53. Thus, the value of resistor 53 (and resistor 51) is chosen so that the forward drop across the collector base junction of transistor 20 will not exceed approximately 350 mv.

Example of values for a non-saturating cell:

| | |
|---|---|
| Transistors **10**, **20**, **30** and **40** | 2N709. |
| Resistors: | |
| **51** | 2K ohms. |
| **52** | 350 ohms. |
| **53** | 350 ohms. |
| L1 | −3 volts. |
| L2 and L3 | Ground or 0 volt. |
| L4 | −2 volts. |

Obviously, many modifications and variations of the present invention are possible in the light of the above teachings. It is therefore to be understood that within the scope of the appended claims, the invention may be practiced other than as specifically described and illustrated.

What is claimed is:

1. A memory cell comprising a pair of transistors having their collectors and bases directly cross-coupled,
- a first resistor connected between the collector of said first transistor and a source of reference potential,
- a second resistance connected between the collector of a second transistor and said reference point,
- a third resistor connector between said reference point and said collector bias, and
- the value of said first, second and third resistance being pre-selected so that the forward voltage across the base collector junction of said first and said second transistor does not exceed a predetermined value so as to prevent saturation of said transistors.

2. A memory cell comprising a pair of transistors having their collectors and bases directly cross-coupled,
- a source of collector bias,
- a first resistor connected between the collector of said first transistor and a reference point,
- a second resistor connected between the collector of said second transistor and said reference point,
- a third resistor connected in a common series circuit with said first and second resistors and said collector bias, and
- the value of said first, second, and third resistors being pre-selected relative to said collector bias so that the voltage across said first and second resistors does not exceed the base to collector junction saturation voltage of said first and said second transistors, respectively.

3. A memory cell as set forth in claim 2 wherein said third resistor is relatively large compared to said first and said second resistors.

4. A memory cell as set forth in claim 3 wherein said third resistor is at least three times as large as said first and second registers.

5. A memory cell as set forth in claim 4 wherein the first and second resistors have the same value.

References Cited

UNITED STATES PATENTS

| | | | |
|---|---|---|---|
| 2,880,330 | 3/1959 | Linvill et al. | 307—280 |
| 2,840,728 | 6/1958 | Haugk et al. | 307—291 |
| 2,954,484 | 9/1960 | Hell et al. | 307—291 |
| 3,423,737 | 1/1969 | Harper | 307—291 |

JOHN S. HEYMAN, Primary Examiner

J. D. FREW, Assistant Examiner

U.S. Cl. X.R.

307—280, 292, 300